US010990372B2

(12) United States Patent
Sarkar et al.

(10) Patent No.: US 10,990,372 B2
(45) Date of Patent: Apr. 27, 2021

(54) UPDATING AN EDGE COMPUTING DEVICE

(71) Applicant: Microsoft Technology Licensing, LLC, Redmond, WA (US)

(72) Inventors: Deepanjyoti Sarkar, Mountain View, CA (US); Kanika Goyal, Santa Clara, CA (US); Devidas Joshi, San Jose, CA (US); Vikas Kumar, San Jose, CA (US); Andrea D'Amato, Kirkland, WA (US); Srikanth Kumar Kovuri Rajaiah, San Jose, CA (US); Ravindra Mysore Seetharam, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/224,480

(22) Filed: Dec. 18, 2018

(65) Prior Publication Data
US 2020/0097274 A1    Mar. 26, 2020

Related U.S. Application Data

(60) Provisional application No. 62/733,907, filed on Sep. 20, 2018.

(51) Int. Cl.
*G06F 8/61* (2018.01)
*G06F 8/65* (2018.01)
(Continued)

(52) U.S. Cl.
CPC .............. *G06F 8/63* (2013.01); *G06F 8/62* (2013.01); *G06F 8/65* (2013.01); *G06F 9/4416* (2013.01);
(Continued)

(58) Field of Classification Search
CPC .............. G06F 8/60–65; G06F 9/4416; G06F 9/44536; G06F 9/44558;
(Continued)

(56) References Cited

U.S. PATENT DOCUMENTS 7,668,938 B1 * 2/2010 Phillips ..................... G06F 8/60
709/220
8,874,888 B1   10/2014 Bed et al.
(Continued)

FOREIGN PATENT DOCUMENTS

CN      102761481 A    10/2012
EP      2336884 A1     6/2011
(Continued)

OTHER PUBLICATIONS

"Call Draining", Retrieved From: https://help.mypurecloud.com/articles/call-draining/, Retrieved on: Jan. 28, 2019, 3 Pages.
(Continued)

*Primary Examiner* — S. Sough
*Assistant Examiner* — Stephen D Berman
(74) *Attorney, Agent, or Firm* — Alleman Hall Creasman & Tuttle LLP

(57) ABSTRACT

Examples are disclosed that relate to updating system software of a computing device located at a network edge between a local network and a cloud service. One disclosed example provides a method comprising booting into a system disk image at a boot location, receiving and storing an updated system disk image from a server computing device. The method further comprises changing the boot location from a location of the system disk image to a location of the updated system disk image and booting into the updated system disk image.

13 Claims, 8 Drawing Sheets

(51) Int. Cl.
*G06F 9/4401* (2018.01)
*G06F 9/445* (2018.01)
*G06F 9/455* (2018.01)

(52) U.S. Cl.
CPC ...... *G06F 9/44536* (2013.01); *G06F 9/45558* (2013.01); *G06F 2009/45562* (2013.01); *G06F 2009/45579* (2013.01)

(58) Field of Classification Search
CPC . G06F 2009/45562; G06F 2009/45579; G06F 8/70; G06F 8/71
See application file for complete search history.

(56) References Cited

U.S. PATENT DOCUMENTS

| | | | |
|---|---|---|---|
| 9,141,400 B2* | 9/2015 | Deal | G06F 9/441 |
| 2003/0221095 A1* | 11/2003 | Gaunt | G06F 11/1417 713/1 |
| 2004/0153724 A1 | 8/2004 | Nicholson et al. | |
| 2004/0205779 A1 | 10/2004 | Almeida et al. | |
| 2007/0208832 A1 | 9/2007 | Traub et al. | |
| 2008/0126446 A1* | 5/2008 | Brunet | G06F 11/1451 |
| 2008/0307215 A1 | 12/2008 | Willems | |
| 2009/0083404 A1* | 3/2009 | Lenzmeier | G06F 8/60 709/221 |
| 2010/0235433 A1* | 9/2010 | Ansari | G06F 16/64 709/203 |
| 2010/0241837 A1* | 9/2010 | Concorso | G06F 9/441 713/2 |
| 2012/0124419 A1 | 5/2012 | Matthew | |
| 2013/0132945 A1* | 5/2013 | Anderson | G06F 8/65 718/1 |
| 2013/0159693 A1* | 6/2013 | Francois | G06F 9/44505 713/100 |
| 2013/0173898 A1 | 7/2013 | Berg et al. | |
| 2014/0033188 A1* | 1/2014 | Beavers | G06F 8/65 717/170 |
| 2014/0181490 A1 | 6/2014 | Campbell et al. | |
| 2014/0181493 A1* | 6/2014 | Deal | G06F 9/441 713/2 |
| 2014/0281466 A1 | 9/2014 | Samuel et al. | |
| 2014/0298091 A1* | 10/2014 | Carlen | H04L 65/80 714/15 |
| 2014/0325140 A1* | 10/2014 | Haug | G06F 9/4401 711/112 |
| 2015/0301880 A1 | 10/2015 | Allu et al. | |
| 2017/0235761 A1* | 8/2017 | Bafna | G06F 8/65 707/827 |
| 2018/0246710 A1 | 8/2018 | Kim et al. | |
| 2019/0012184 A1* | 1/2019 | Feinberg | G06F 9/4416 |
| 2019/0036781 A1* | 1/2019 | Prabhu | H04L 67/34 |

FOREIGN PATENT DOCUMENTS

| | | |
|---|---|---|
| WO | 2017179537 A1 | 10/2017 |
| WO | 2018095537 A1 | 5/2018 |

OTHER PUBLICATIONS

"Edge Device Management", Retrieved From: https://relayr.io/value-stack/technology-edge/, Retrieved on: Jan. 28, 2019, 2 Pages.

"Scheduling Firebox X Edge Firmware Updates", Retrieved From: https://web.archive.org/web/20120311213927/http:/www.watchguard.com/training/fireware/82/centra14.htm, Mar. 11, 2012, 2 Pages.

"Viewing and Updating Distributions", Retrieved From: https://docs.aws.amazon.com/AmazonCloudFront/latest/DeveloperGuide/HowToUpdateDistribution.html, Retrieved on: Jan. 28, 2019, 2 Pages.

George, et al., "Hierarchical Split of Application Between Cloud and Edge", Application as Filed in U.S. Appl. No. 15/784,048, filed Oct. 13, 2017, 41 Pages.

Mani, et al., "Increasing Virtual Machine Availability During Server Updates", Provisional Application as Filed in U.S. Appl. No. 62/503,840, filed May 9, 2017, 32 Pages.

Beningo, Por Jacob, "Updating Firmware at the Edge Using Amazon FreeRTOS", Retrieved From: https://www.digikey.com/es/articles/techzone/2018/may/updating-firmware-at-the-edge-using-amazon-freertos, May 9, 2018, 7 Pages.

Califan, Jessica, "How to Approach OTA Updates for IoT", Retrieved From: https://dzone.com/articles/how-to-approach-ota-updates-for-iot, Jun. 19, 2018, 4 Pages.

Eforzano, et al., "Bluecats/Bluecats-Docs-Edge", Retrieved From: https://github.com/bluecats/bluecats-docs-edge/blob/master/edge-0.2.X/edge-update-firmware.md, Retrieved on: Jan. 28, 2019, 4 Pages.

Zimmermann, Kai, "Components for cloud-based software updates in the IoT", Retrieved From: https://blog.bosch-si.com/internetofthings/components-cloud-based-software-updates-iot-device-connectivity/, Dec. 5, 2016, 12 Pages.

"International Search Report and Written Opinion Issued in PCT Application No. PCT/US19/038851", dated Sep. 13, 2019, 12 pages.

\* cited by examiner

UPDATING AN EDGE COMPUTING DEVICE

CROSS REFERENCE TO RELATED APPLICATIONS

This application claims priority to U.S. Provisional Patent Application Ser. No. 62/733,907, filed Sep. 20, 2018, and entitled "UPDATING AN EDGE COMPUTING DEVICE", the entirety of which is hereby incorporated by reference for all purposes.

BACKGROUND

Many types of computing devices receive updates to software and/or firmware by download over computer networks, wherein the updates are in the form of individual binary files configured to replace prior versions of those files.

SUMMARY

Examples are disclosed that relate to updating system software of a computing device configured to be located at a network edge between a local network and a cloud service. One disclosed example provides a method comprising booting into a system disk image at a boot location, and receiving and storing an updated system disk image from a server computing device. The method further comprises changing the boot location from a location of the system disk image to a location of the updated system disk image and booting into the updated system disk image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
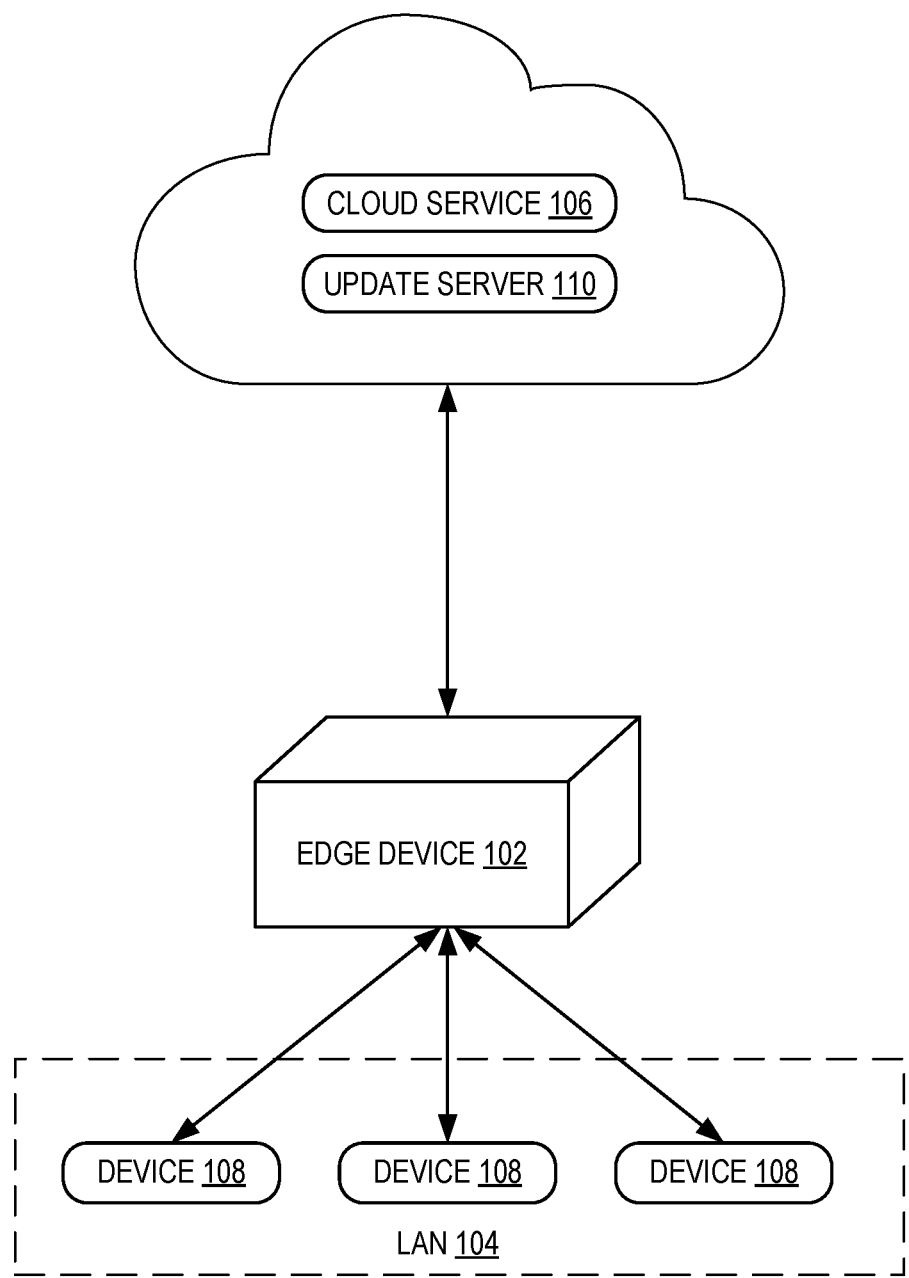
FIG. 1 shows a block diagram of an example computing environment comprising an edge computing device between a local network and a cloud service.

A networked computing environment may comprise distributed server systems that enable data to be stored and processed in a computing "cloud" system accessible by client devices over a wide area network. Such environments also may include "edge" computing devices that are located at an interface of a local area network (LAN) and a wide area network (WAN), such as the internet. An edge computing device may help manage uploads/downloads to/from cloud services in an efficient manner, and may cache uploaded files locally for faster client access to the files. Further, an edge computing device also may include some processing functionality of a cloud service (e.g. classification/machine learning functions), and thus may help to provide for lower latency processing of data and more efficient network bandwidth usage compared to sending the data to the cloud service for processing.

Various components of a LAN may be configured to receive updates to software and firmware from a remote server system automatically via computer network. For example, a personal computer (PC) within a LAN may receive updates via an auto-update application that communicates with a remote update service in the cloud. As updates are made available through the cloud-based update service, the auto-update application on the PC communicates with the cloud service to download the updates, and also may manage installation of the updates. The updates may be provided as individual binary files configured to replace specific older binaries on the PC.

Under such an update system, various software and/or firmware components of the PC may be updated at different times and at different rates. In the case of an edge computing device, such an update process may pose various issues. For example, due the different times and frequencies at which different software and/or firmware components may be updated, compatibility issues may arise. Further, a computing device may not work properly if any updates are only partially installed. Additionally, when problems with an update arise, it may be difficult to identify and roll back individual updates to correct the issues. Also, a computing device may operate more slowly or be unavailable while the updates are installed. In addition, a software binary update mechanism may not handle entire operating system updates well. For example, updating the edge computing device from a first version of a server operating system to a second version of the server operating system may be difficult. As an edge computing device is configured to act as a seamless extension of cloud functionality at a location physically closer to the user than a cloud data center, any such performance issues may negatively impact a user experience.

Accordingly, examples are disclosed that relate to updating computing devices, such as edge computing devices, in a manner that may help to avoid such issues. Briefly, instead of individual updated binaries, an updated system disk image may be obtained from a server computing device and stored on the computing device, wherein the updated system disk image has been tested to help ensure compatibility of components on the image and expected performance. A boot location then may be changed to a location of the updated system disk image, and the computing device may then boot into the updated system disk image. In contrast with piecemeal update methods, the download of an entire disk image allows the computing device to conveniently be updated with a full stack of well-tested, updated software.

FIG. 1 shows an example computing environment including an edge computing device 102 located at a network edge between a local area network (LAN) 104 and a cloud service 106. The edge computing device 102 may reside at any suitable location between the LAN 104 and the cloud service 106, such as in a server rack of the LAN 104 or other suitable location on the customer's physical premises, at a cell tower, a WiFi hotspot, and/or an intermediate data center between the local network and the cloud service, as examples.

In some examples, the edge computing device 102 may be configured to complement the cloud service 106 by providing one or more services at the network edge. For example, the edge computing device 102 may provide storage or data processing services to one or more client-side devices 108, which may include as workstations (e.g. PCs), internet of things (IoT) devices (e.g. camera systems and/or other sensors), and/or or mobile computing devices. As described above, the edge computing device 102 may be configured as a local cache for managing the uploading and downloading of data to/from the cloud, and may be configured to perform some data processing tasks locally. The edge computing device 102 also may be configured to provide storage tiering, data backup, and/or any other suitable services. By providing such services at the network edge, the edge computing device 102 may reduce latency between the cloud service 106 and the client-side devices 108 and provide continuity-of-service during lapses in connectivity with the cloud, among other advantages.

Figure 2:
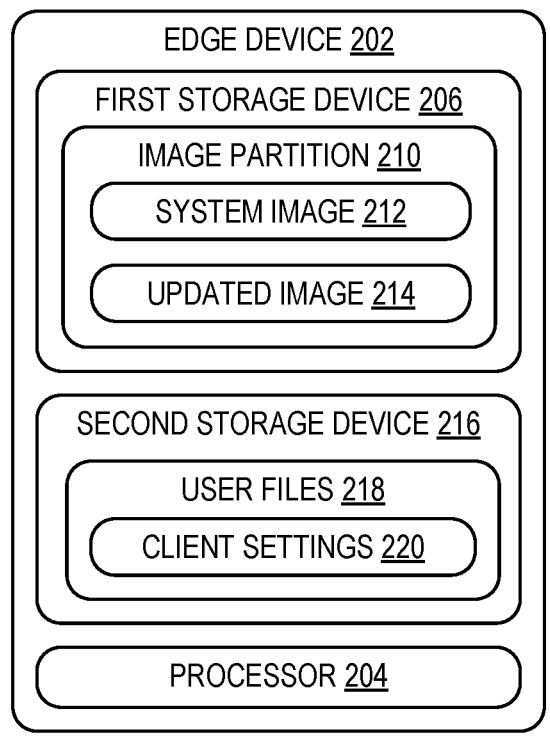
FIG. 2 shows a block diagram of an example edge computing device.

Updates to edge device software and/or firmware may be provided to the edge computing device 102 via a server computing device, such as cloud service 106 or another update server 110. FIG. 2 shows a block diagram of an edge computing device 202 (which may represent edge computing device 102) that has obtained a software and/or firmware update. The edge computing device 202 comprises a processor 204 and one or more physical storage devices, such as first storage device 206 and second storage device 216, among other possible components.

The first storage device 206 comprises an image partition 210 storing one or more bootable system images, such as system disk image 212 and updated system disk image 214. Prior to obtaining the updated system disk image 214, the edge computing device 202 may boot into the system disk image 212. During an update, the updated system disk image 214 is obtained, and the boot location is changed to the location of the updated system disk image 214. The system then reboots into the updated system disk image 214.

In some examples, the edge computing device 202 may include multiple physical hardware storage devices, an example of which is depicted in FIG. 2 as second storage device 216. The second storage device 216 may be used to store user files 218 and/or client settings 220. In this manner, any errors encountered on the first storage device 206 may be isolated so as not to affect the user files 218 or the client settings 220.

Figure 3:
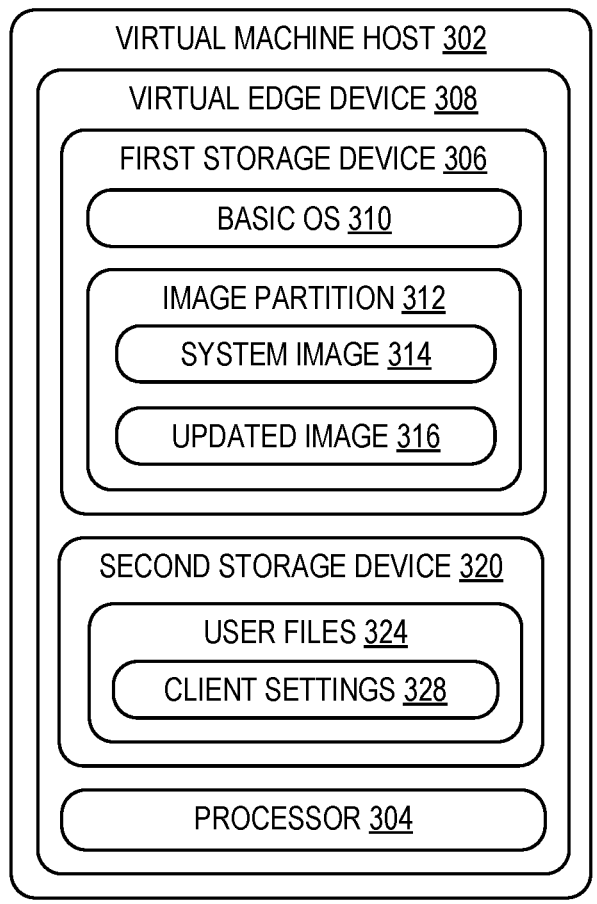
FIG. 3 shows a block diagram of an example host computing device comprising a virtual machine.

In the example of FIG. 2, image partition 210 is a partition of a physical disk and is configured to boot a physical device. In other examples, the image partition may reside on a virtual hard disk and may be configured to boot a virtual machine installed on a suitable computing device. FIG. 3 depicts a block diagram of a virtual machine host device 302, such as a hypervisor host. The virtual machine host 302 is configured to boot a virtual edge device 308 into a basic OS 310 located on a first virtual storage device 306. The host 302 is also configured to mount an image partition 312 of the first virtual storage device 306 as a virtual hard disk (VHD) for the virtual edge device 308. After being set up on the host, the virtual edge device 308 may operate in a manner analogous to the edge computing device 202 of FIG. 2 to enable any suitable physical computing device to operate as the edge computing device 302.

The image partition 312 may be analogous to the image partition 210 in the example of FIG. 2. The image partition 312 may host one or more bootable disk images, such as a system disk image 314 and an updated system disk image 316 (downloaded as an update, for example), analogous to the system disk image 212 and the updated system disk image 214 in the example of FIG. 2.

As described above, the virtual edge device 308 may be configured to boot into the basic OS 310. The basic OS 310 may be configured to change a boot location of the virtual edge device 308 to boot into the system disk image 314 a first time the virtual edge device 308 is set up. Then, for updates, an OS running inside the system disk image 314 downloads the updated system disk image 316 and swaps the boot location of the virtual edge device 308 to the updated image 316.

The virtual edge device 308 may include multiple virtual storage devices. One example is depicted in FIG. 3 as second storage device 320. The second storage device 320 may be used to store user files 324 and/or client settings 328 for the virtual edge device 308. In addition to the virtual storage devices, the virtual edge device 308 also comprises a processor 304.

Figure 4:
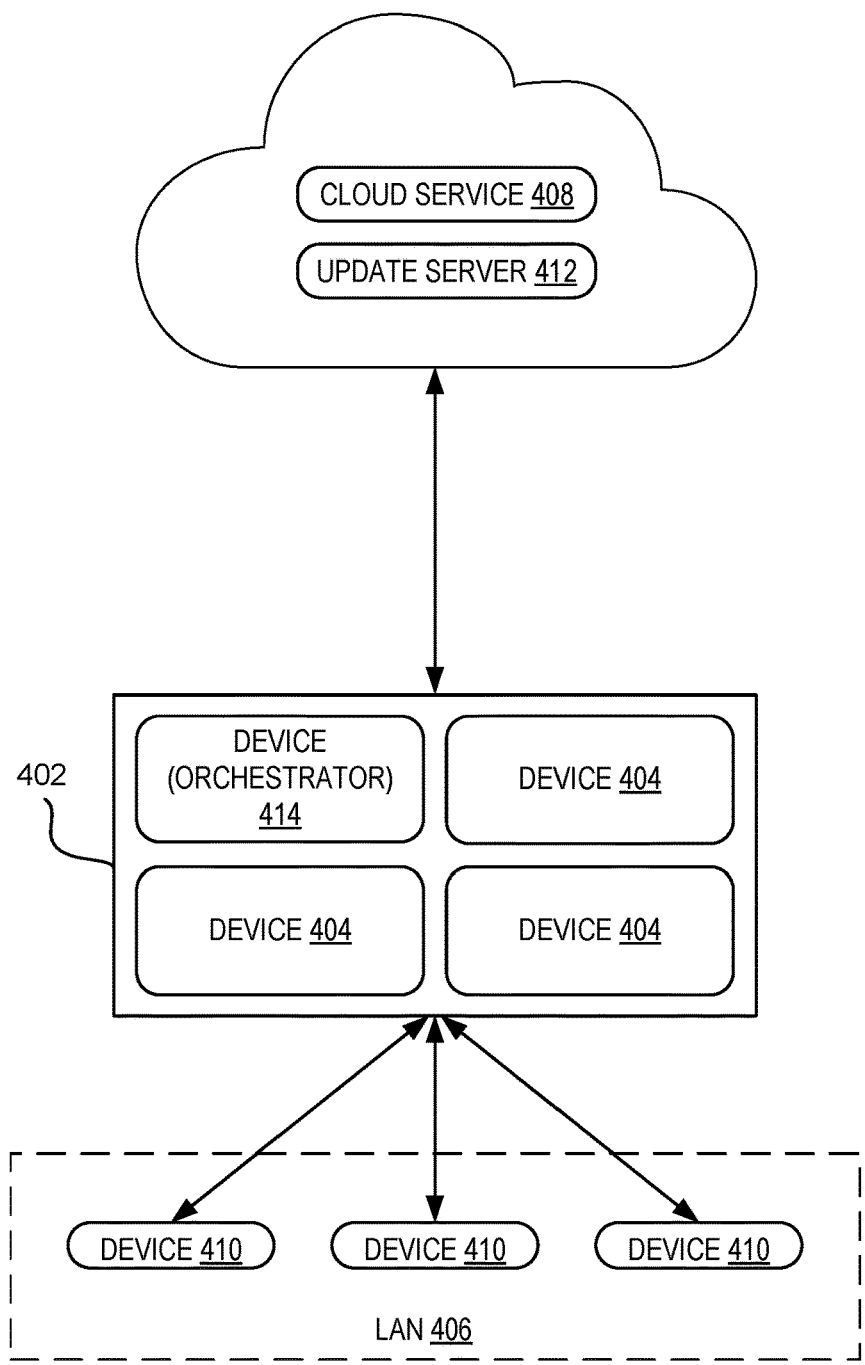
FIG. 4 illustrates an example of a cluster of computing devices configured to be located at a network edge between a local network and a cloud service.

With reference now to FIG. 4, an example computing environment is illustrated in which a cluster 402 of computing devices 404 may operate as an edge computing device, wherein each of the computing devices 404 may be referred to as an edge device node. The cluster 402 is located at a network edge between a LAN 406 and a cloud service 408, analogous to the edge computing device 102 of FIG. 1. However, each individual computing device 404 may be structurally analogous to the computing devices 202 and/or 302 in the examples of FIG. 2 and FIG. 3, respectively. The use of such a cluster may allow computer resource usage to be dynamically scaled according to client need, and provide redundancy in data storage, among other possible advantages.

Like the edge computing device 102 example of FIG. 1, the cluster 402 may be configured to complement the cloud service 408 by providing one or more services at the network edge to one or more client-side devices 410, such as workstations in the customer's office, internet of things (IoT) devices (e.g. cameras and/or other sensors), and/or mobile computing devices. In some examples, one node of the cluster 402 may be configured as an orchestrator 414 to manage one or more other nodes 404. The orchestrator 414 may be similar or identical to each of the nodes 404 from a hardware standpoint, but may include software executable to exercise control over various aspects of the other nodes of the cluster 402. For example, the orchestrator 414 may coordinate an updating process between the cluster 402 and an update server 412.

Updating the cluster 402 may present various challenges compared to updating a single edge device. For example, if updating of the cluster is not commonly controlled, two or more nodes 404 may end up booting into different versions of the system disk image, thereby giving rise to compatibility issues between the different nodes of the cluster. Accordingly, the orchestrator 414 may be configured to orchestrate the updating of the nodes 404 in the cluster 402 to help ensure that each node is configured to boot into the same version of the system disk image.

Figure 5A:
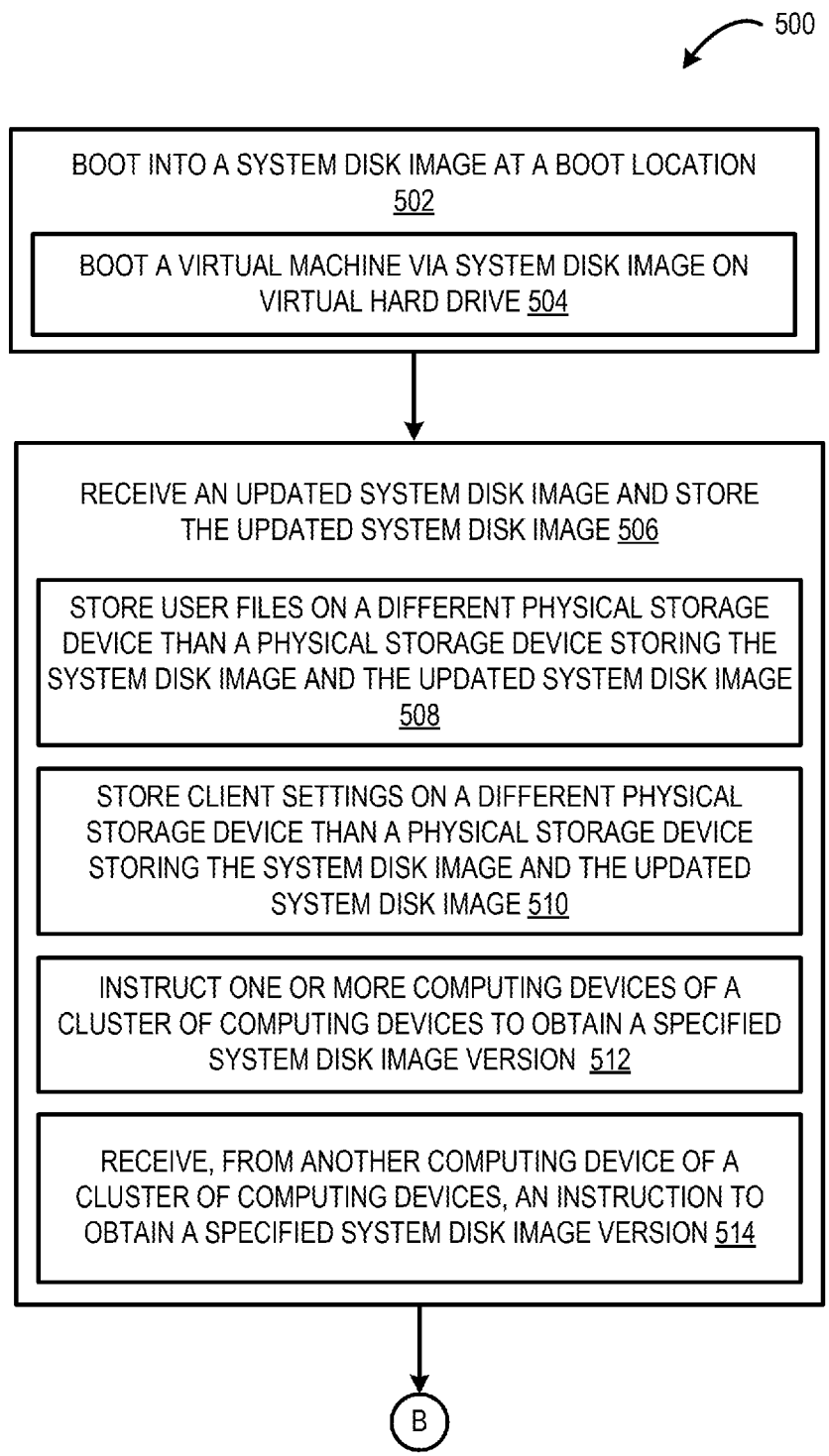
FIGS. 5A-5B show a flow diagram depicting an example method for updating system software of a computing device.
Figure 5B:
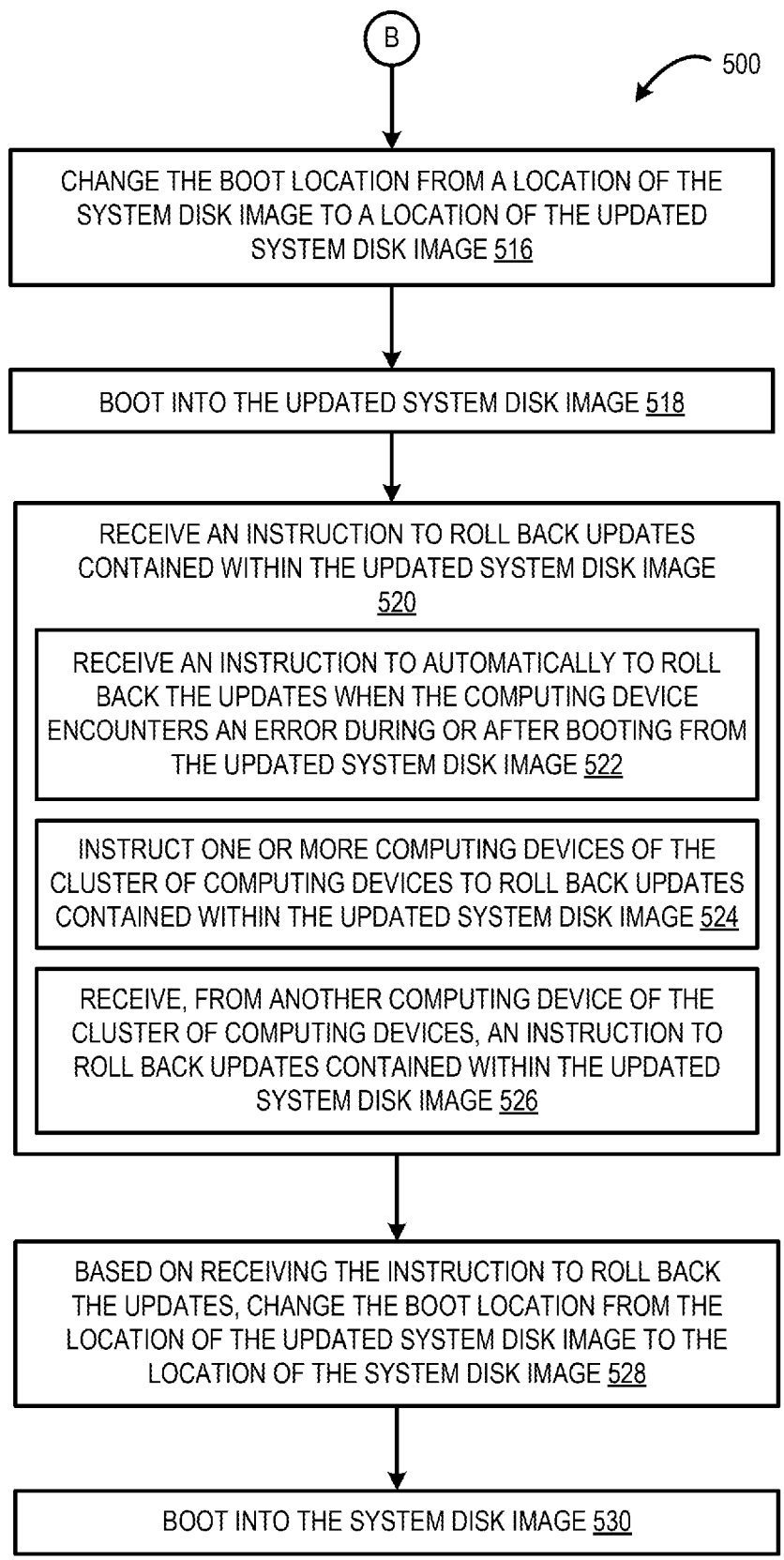

FIGS. 5A-5B show a flow diagram depicting an example method 500 for updating system software of a computing device. The following description of method 500 is provided with reference to the software and hardware components described above and shown in FIGS. 1-4, but it will be appreciated that method 500 also may be performed in other contexts using other suitable hardware and software components.

First referring to FIG. 5A, at 502, method 500 includes booting into a system disk image at a boot location. In some examples, as illustrated in FIG. 2, booting the edge computing device 202 may comprise booting a physical edge computing device 202 into the system disk image 212 located within an image partition 210. In other examples, at 504, method 500 may include booting a virtual edge computing device into a system disk image stored on a virtual hard disk hosted by a physical machine. In yet other examples, an edge computing device may be implemented via any suitable arrangement of physical and virtual machines.

Method 500 further includes, at 506, receiving an updated system disk image from a server computing device and storing the updated system disk image. The updated system disk image may comprise a full updated stack with consistent and well-tested dependencies, which may help ensure software and firmware compatibility.

In the physical machine update example of FIG. 2, the edge computing device 202 may receive the updated system disk image 214 from a server computing device, such as the update server 110 of FIG. 1, and store the updated system disk image 214 in a new directory within the image partition 210 on the first storage device 206. In such examples, as indicated at 508, user files may be stored on a different physical storage device than a physical storage device storing the system disk image and the updated system disk image. Likewise, client settings also may be stored on a different physical storage device than that used to store the system disk image and updated system disk image, as indicated at 510.

Where the edge computing device is one of a cluster of computing devices (virtual or physical), the edge computing device may act as an orchestrator and instruct one or more other computing devices of the cluster to obtain a specified system disk image version, as indicated at 512. It will be appreciated that this may be the most recently updated system disk image or may be an older version of the system disk image. For example, some updates may run successfully on some nodes, but not on others. As it may be desirable for all the nodes of the cluster to be consistent, the orchestrator may instruct all other nodes of the cluster to use a prior system disk image to help ensure that each node of the cluster is operating using the same prior system disk image.

Continuing with the cluster example, where the edge computing device is not an orchestrator device, method 500 may include, at 514, receiving, from another computing device of the cluster of computing devices (e.g. an orchestrator device), an instruction to obtain a specific version of the updated system disk image. The edge computing device may then obtain and store the specific version of the updated system disk image as described above with reference to process 512.

Referring next to FIG. 5B, having received the updated system disk image, at 516, method 500 includes changing the boot location from a location of the system disk image to a location of the updated system disk image. As described above with reference to FIG. 2, the boot location of the physical edge computing device 202 itself may be changed. In another example, as described above regarding FIG. 3, changing the boot location may comprise changing the boot location of the virtual machine 310.

Next, at 518, method 500 includes booting into the updated system disk image. For example, the edge computing device 202 may boot directly into the updated system disk image 214, or the virtual edge device 308 may boot into the updated system disk image 316. In this manner, the edge computing device may access a uniform, updated stack provided by the updated system disk image, avoiding potential disruptions associated with installing individual updates.

In some circumstances, it may be desirable to roll back or revert updates installed on the edge computing device to a previous version. Accordingly, at 520, method 500 includes receiving an instruction to roll back updates contained within the updated system disk image. For example, if an error arising from the updated system disk occurs during or after booting into the updated system disk image, it may be less disruptive for the edge computing device to resume booting into an older version of the system disk image. Accordingly, in some examples, a server computing device operated by the service provider, a LAN administrator, or other entity may instruct the edge computing device to roll back the updates. In other examples, at 522, the instruction may be automatically generated via a program on the edge computing device itself when the computing device encounters an error during or after booting into the updated system disk image. For example, the system disk image, the updated system disk image, and/or the basic OS may include an executable that may detect potential errors and instruct the edge device to roll back the updates if an error is detected.

In examples that utilize a cluster of computing devices, the instruction may be provided by an orchestrator device. Accordingly, at 524, method 500 may include, at one node of a cluster of computing devices, instructing one or more computing devices of the cluster of computing devices to roll back updates contained within the updated system disk image. For example, the updated system may run correctly on some of the computing devices 404 in the example of FIG. 4, but not on others. In this example, the orchestrator 414 may be configured to instruct one or more of the computing devices 404 booting into the updated system disk image to roll back the updates to an older version of the system disk image. In this manner, the orchestrator 414 may ensure that each node of the cluster may boot into the same version of the system disk image.

Likewise, where the computing device is within a cluster but not an orchestrator, method 500 may comprise, at one node of a cluster of computing devices, receiving, from another computing device of the cluster of computing devices, an instruction to roll back updates contained within the updated system disk image, as indicated at 526. For example, one of the computing devices 404 may receive this instruction from the orchestrator 414.

At 528, method 500 further comprises, based on receiving the instruction to roll back the updates, changing the boot location from the location of the updated system disk image to the location of the system disk image. It will be appreciated that the boot location may be changed in a similar manner as described above regarding process 516. In this manner, the edge computing device may quickly access the stack contained within the system disk image.

As updating the edge computing device is performed by swapping the boot location, in some examples, the edge computing device may either retain or delete one or more previous versions of the system disk image after successfully booting into the updated system disk image. Retaining a previous version allows updates to be rolled back to a previous version of the system disk image without downloading or otherwise obtaining the previous version of the system disk image from another storage location, but does utilize storage space for each prior system disk image. As such, in some examples, a single prior version (e.g. an immediately prior version) of the image may be retained.

Continuing, at 530, after the boot location is changed to the system image, method 500 includes booting into the system disk image. The edge computing device then utilizes a previous version of the stack installed on the system disk image. In this manner, the updates may be quickly and uniformly rolled back, which may ensure consistency between different edge computing devices and reduce disruptions experienced by the customer.

Figure 6:
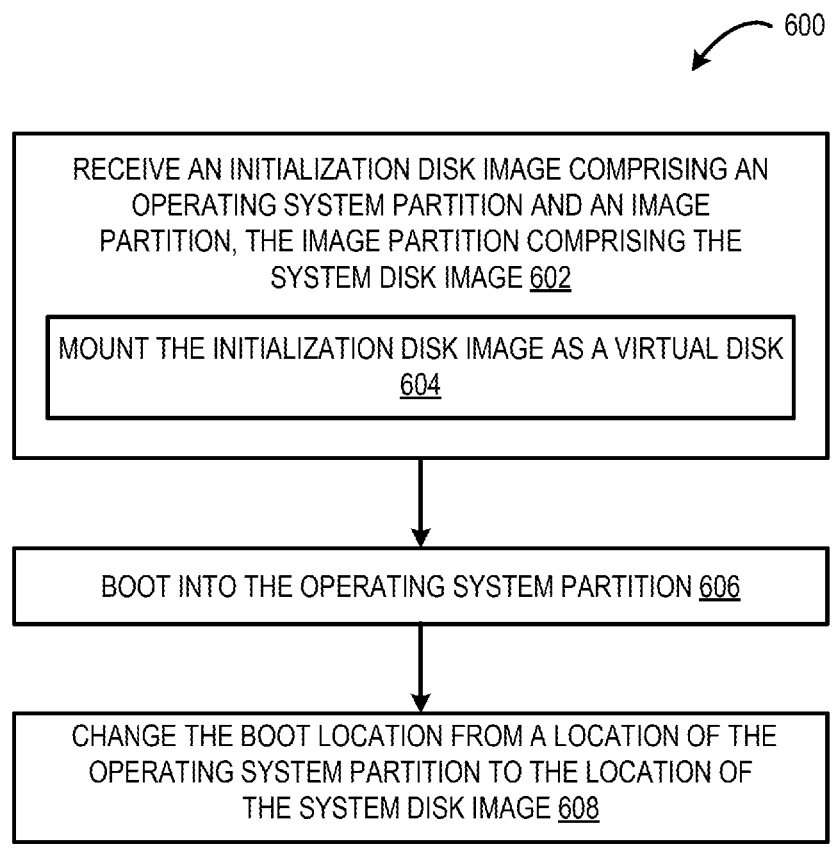
FIG. 6 shows a flow diagram depicting an example method for initially setting up a virtual edge computing device.

As described above, in examples where an edge computing device is implemented as a virtual machine, the system disk image may be installed as a virtual hard disk on a host physical computing device. FIG. 6 shows an example method 600 for initially setting up a virtual edge computing device as a virtual machine. Method 600 includes, at 602, receiving an initialization disk image, e.g. by downloading the initialization disk image from a cloud service. As indicated at 604, the method 600 may include mounting the initialization disk image as a virtual disk. For example, the initialization disk image 312 may be mounted as a VHD in the example of FIG. 3.

The initialization disk image comprises an operating system partition and an image partition, the image partition comprising the system disk image. Method 600 further comprises, at 606, booting into the operating system partition, and then at 608 changing the boot location from a location of the operating system partition to the location of the system disk image.

In some examples, the methods and processes described herein may be tied to a computing system of one or more computing devices. In particular, such methods and processes may be implemented as a computer-application program or service, an application-programming interface (API), a library, and/or other computer-program product.

Figure 7:
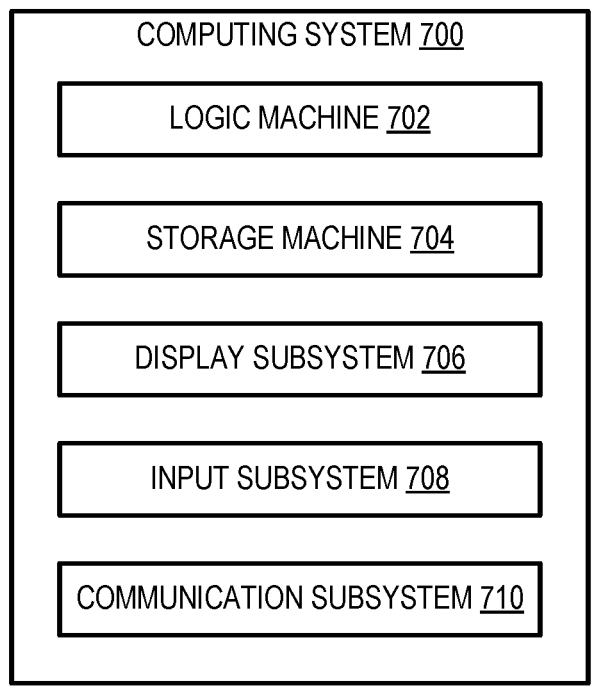
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. For example, the computing devices 102, 202, 302, and 404, the orchestrator 414, and/or the client-side devices 108 and 410 may comprise aspects of the computing system 700.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic machine 702 executing instructions held by storage machine 704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides, on a computing device configured to be located at a network edge between a local network and a cloud service, a method for updating system software of the computing device, the method comprising: booting into a system disk image at a boot location, receiving, from a server computing device, an updated system disk image and storing the updated system disk image, changing the boot location from a location of the system disk image to a location of the updated system disk image, and booting into the updated system disk image. The method may additionally or alternatively include storing user files on a different physical storage device than a physical storage device storing the system disk image and the updated system disk image. The method may additionally or alternatively include storing client settings on a different physical storage device than a physical storage device storing the system disk image and the updated system disk image. Booting into the system disk image at the boot location may additionally or alternatively include booting a virtual machine into the system disk image. The method may additionally or alternatively include, before booting into the system disk image at the boot location, installing the system disk image by receiving an initialization disk image, the initialization disk image comprising an operating system partition and an image partition, the image partition comprising the system disk image, booting into the operating system partition, and changing the boot location from a location of the operating system partition to the location of the system disk image. The method may additionally or alternatively include mounting the initialization disk image as a virtual disk. The method may additionally or alternatively include receiving an instruction to roll back updates contained within the updated system disk image, based on receiving the instruction to roll back the updates, changing the boot location from the location of the updated system disk image to the location of the system disk image, and booting into the system disk image. Receiving the instruction to roll back the updates may additionally or alternatively include receiving an instruction to automatically to roll back the updates if the computing device encounters an error during or after booting into the updated system disk image. The computing device may additionally or alternatively include one node of a cluster of computing devices. The method may additionally or alternatively include instructing one or more computing devices of the cluster of computing devices to boot into a specified system disk version. The method may additionally or alternatively include receiving, from another computing device of the cluster of computing devices, an instruction to boot into a specified system disk version.

Another aspect provides a computing device comprising a processor, and a storage device storing instructions executable by the processor to receive an initialization disk image, the initialization disk image comprising an operating system partition and an image partition, the image partition comprising a system disk image, boot into the operating system partition, change a boot location from a location of the operating system partition to a location of the system disk image, boot into the system disk image, receive an updated system disk image, change the boot location from the location of the system disk image to a location of the updated system disk image, and boot into the updated system disk image. Booting into the operating system partition may additionally or alternatively include booting a virtual machine into the operating system partition, and changing the boot location may additionally or alternatively include changing the boot location of the virtual machine. The instructions may additionally or alternatively be executable to mount the initialization disk image as a virtual disk. The instructions may additionally or alternatively be executable to receive an instruction to roll back updates contained within the updated system disk image, based on receiving the instruction to roll back the updates, change the boot location from the location of the updated system disk image to the location of the system disk image, and boot into the system disk image. The instructions may additionally or alternatively be executable to automatically roll back the updates if the computing device encounters an error during or after booting into the updated system disk image. The instructions may additionally or alternatively be executable to instruct one or more other computing devices of a cluster of computing devices to boot into a specified system disk image version. The instructions may additionally or alternatively be executable to receive, from another computing device of a cluster of computing devices, an instruction to boot into a specified system disk image version.

Another aspect provides a computing device configured to orchestrate updating system software on a plurality of computing devices of a cluster of computing devices, the computing device comprising a processor, and a storage device storing instructions executable by the processor to configure a boot location for each computing device of the plurality of computing devices to boot into a location of a system disk image, receive an updated system disk image, and change the boot location from the location of the system disk image to a location of the updated system disk image such that each computing device of the plurality of computing devices boots into the updated system disk image. The instructions may additionally or alternatively be executable to receive an initialization disk image, the initialization disk image comprising an operating system partition and an image partition, the image partition comprising the system disk image, configure the boot location for each computing device of the plurality of computing devices to boot into a location of the operating system partition, and change the boot location from the location of the operating system partition to the location of the system disk image such that each computing device of the plurality of computing devices boots into the system disk image. The instructions may additionally or alternatively be executable to instruct each computing device of the plurality of computing devices to boot into a specified system disk image version.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device configured as an edge device node in a cluster of computing devices configured to operate as an edge computing device located at a network edge between a local network and a cloud service to perform functions of the cloud service at the network edge, a method for updating system software of the computing device, the method comprising:
    booting into a system disk image at a boot location;
    receiving, from a server computing device, an updated system disk image and storing the updated system disk image;
    changing the boot location from a location of the system disk image to a location of the updated system disk image;
    booting into the updated system disk image;
    detecting a potential error, wherein the detecting is performed at the computing device; and
    receiving an instruction to roll back to a specified prior version of the system disk image, wherein receiving the instruction to roll back comprises automatically generating the instruction at the computing device in response to detecting the potential error;
    based on receiving the instruction to roll back, changing the boot location from the location of the updated system disk image to a location of the specified prior version of the system disk image;
    booting into the specified prior version of the system disk image; and
    sending an instruction to another edge computing device of the cluster of computing devices to utilize the specified prior version of the system disk image such that each node of the cluster of computing devices is operating using the same prior version of the system disk image.

2. The method of claim 1, further comprising storing user files on a different physical storage device than a physical storage device storing the system disk image and the updated system disk image.

3. The method of claim 1, further comprising storing client settings on a different physical storage device than a physical storage device storing the system disk image and the updated system disk image.

4. The method of claim 1, wherein booting into the system disk image at the boot location comprises booting a virtual machine into the system disk image.

5. The method of claim 1, further comprising, before booting into the system disk image at the boot location, installing the system disk image by:
    receiving an initialization disk image, the initialization disk image comprising an operating system partition and an image partition, the image partition comprising the system disk image;
    booting into the operating system partition; and
    changing the boot location from a location of the operating system partition to the location of the system disk image.

6. The method of claim 5, further comprising mounting the initialization disk image as a virtual disk.

7. The method of claim 1, wherein receiving the instruction to roll back comprises receiving the instruction if the computing device encounters an error during or after booting into the updated system disk image.

8. A computing device configured as an edge device node in a cluster of computing devices configured to operate as an edge computing device located at a network edge between a local network and a cloud service to perform functions of the cloud service at the network edge, the computing device comprising:
    a processor; and
    a storage device storing instructions executable by the processor to
        receive an initialization disk image from a cloud-side update server, the initialization disk image comprising an operating system partition and an image partition, the image partition comprising a system disk image;
        boot into the operating system partition;
        change a boot location from a location of the operating system partition to a location of the system disk image;
        boot into the system disk image;
        receive an updated system disk image;
        change the boot location from the location of the system disk image to a location of the updated system disk image;
        boot into the updated system disk image;
        detect a potential error, wherein the detecting is performed at the computing device;
        receive an instruction to roll back to a specified prior version of the system disk image, wherein receiving the instruction to roll back comprises automatically generating the instruction at the computing device in response to detecting the potential error;
        based on receiving the instruction to roll back, change the boot location from the location of the updated system disk image to a location of the specified prior version of the system disk image;
        boot into the specified prior version of the system disk image; and
        send an instruction to another edge computing device of the cluster of computing devices to utilize the specified prior version of the system disk image such that each node of the cluster of computing devices is operating using the same prior version of the system disk image.

9. The computing device of claim 8, wherein booting into the operating system partition comprises booting a virtual machine into the operating system partition, and wherein changing the boot location comprises changing the boot location of the virtual machine.

10. The computing device of claim 8, wherein the instructions are further executable to mount the initialization disk image as a virtual disk.

11. The computing device of claim 8, wherein the instructions are further executable to automatically roll back if the computing device encounters an error during or after booting into the updated system disk image.

12. A computing device configured as an edge device node in a cluster of computing devices configured to operate as an edge computing device located at a network edge between a local network and a cloud service to perform functions of the cloud service at the network edge, the computing device configured to orchestrate updating system software on a plurality of computing devices of the cluster of computing devices, the computing device comprising:
   a processor; and
   a storage device storing instructions executable by the processor to
      configure a boot location for each computing device of the plurality of computing devices to boot into a location of a system disk image, wherein each computing device of the plurality of computing devices is configured to be located at the network edge between the local network and the cloud service;
      receive an updated system disk image from a cloud-side update server;
      change the boot location from the location of the system disk image to a location of the updated system disk image such that each computing device of the plurality of computing devices boots into the updated system disk image;
      determine that an error has occurred on one or more computing devices of the plurality of computing devices, wherein the determining is performed at the computing device;
      automatically generate, at the computing device, an instruction to roll back to a specified prior version of the system disk image in response to determining that the error has occurred; and
      send the instruction to each computing device of the cluster of computing devices, such that each node of the cluster of computing devices is operating using the same prior version of the system disk image.

13. The computing device of claim 12, wherein the instructions are further executable to:
   receive an initialization disk image, the initialization disk image comprising an operating system partition and an image partition, the image partition comprising the system disk image;
   configure the boot location for each computing device of the plurality of computing devices to boot into a location of the operating system partition; and
   change the boot location from the location of the operating system partition to the location of the system disk image such that each computing device of the plurality of computing devices boots into the system disk image.

* * * * *